US009784381B2

(12) United States Patent
Vu et al.

(10) Patent No.: US 9,784,381 B2
(45) Date of Patent: Oct. 10, 2017

(54) BALANCED POPPET FLOAT VENT VALVE

(71) Applicant: EATON CORPORATION, Cleveland, OH (US)

(72) Inventors: Anh Hung Vu, Santa Ana, CA (US); James William Reinholdt, San Clemente, CA (US)

(73) Assignee: Eaton Corporation, Cleveland, OH (US)

(*) Notice: Subject to any disclaimer, the term of this patent is extended or adjusted under 35 U.S.C. 154(b) by 16 days.

(21) Appl. No.: 14/779,899

(22) PCT Filed: May 27, 2014

(86) PCT No.: PCT/US2014/039557
§ 371 (c)(1),
(2) Date: Sep. 24, 2015

(87) PCT Pub. No.: WO2014/190345
PCT Pub. Date: Nov. 27, 2014

(65) Prior Publication Data
US 2016/0061342 A1    Mar. 3, 2016

Related U.S. Application Data

(60) Provisional application No. 61/827,121, filed on May 24, 2013.

(51) Int. Cl.
*F16K 31/18* (2006.01)
*F16K 24/04* (2006.01)
(Continued)

(52) U.S. Cl.
CPC ...... *F16K 24/044* (2013.01); *B60K 15/03519* (2013.01); *F16K 15/063* (2013.01);
(Continued)

(58) Field of Classification Search
CPC ......... Y10T 137/0874; Y10T 137/3099; Y10T 137/86324; Y10T 137/7358;
(Continued)

(56) References Cited

U.S. PATENT DOCUMENTS 5,409,030 A    4/1995  Sung
5,638,856 A *  6/1997  Ohsaki ............ B60K 15/03519
                                                            137/202
(Continued)

FOREIGN PATENT DOCUMENTS

WO    2010/022431 A1    3/2010

OTHER PUBLICATIONS

European Patent Office; International Search Report and Written Opinion issued in corresponding International Application No. PCT/US2014/039557. Date of Mailing: Sep. 29, 2014.

*Primary Examiner* — Jessica Cahill
(74) *Attorney, Agent, or Firm* — Fishman Stewart PLLC (57) ABSTRACT

A vent valve may include, among other things, a valve body having an inlet opening and an outlet opening forming a flow path. The inlet opening may be oriented in a first direction and the outlet opening may be oriented in a second direction. A poppet member may be provided on or about the valve body and can be configured for movement between an opened position and a closed position relative to the inlet opening. The poppet member may be movable along the valve body in a direction that is perpendicular to the first direction of the inlet opening. A float member may be attached or operatively connected to the poppet member, the float member configured to move the poppet member between the first and second positions.

20 Claims, 4 Drawing Sheets

(51) Int. Cl.
*B60K 15/035* (2006.01)
*F16K 31/22* (2006.01)
*F16K 15/06* (2006.01)
*B60K 15/03* (2006.01)

(52) U.S. Cl.
CPC .............. *F16K 24/04* (2013.01); *F16K 31/22* (2013.01); *B60K 2015/03289* (2013.01)

(58) Field of Classification Search
CPC ......... Y10T 137/7423; Y10T 137/7426; Y10T 137/7433; Y10T 137/7436; F16K 24/044; F16K 15/063; F16K 24/04; F16K 31/22; B60K 15/03519; B60K 2015/03289
See application file for complete search history.

(56) References Cited

U.S. PATENT DOCUMENTS

| | | | |
|---|---|---|---|
| 6,230,732 B1 | 5/2001 | Ganachaud et al. | |
| 6,755,206 B2 * | 6/2004 | Nishi | F16K 24/044 137/202 |
| 7,614,417 B2 * | 11/2009 | Simon | B60K 15/03519 137/202 |
| 2004/0060596 A1 * | 4/2004 | Frohwein | F16K 1/36 137/202 |
| 2005/0284875 A1 | 12/2005 | Kito | |
| 2006/0162774 A1 * | 7/2006 | Smit | B67D 7/365 137/202 |
| 2008/0092962 A1 | 4/2008 | Theissler et al. | |

\* cited by examiner

BALANCED POPPET FLOAT VENT VALVE

CROSS REFERENCE TO RELATED APPLICATIONS

This application is a national stage filing based upon International Application No. PCT/US2014/039557, with an international filing date of May 27, 2014, which claims the benefit of U.S. Provisional Application Ser. No. 61/827,121, filed May 24, 2013, the disclosure of which is incorporated herein by reference in its entirety.

TECHNICAL FIELD

The present disclosure relates to vent valves, including a float operated vent valve having a poppet member configured to require little or no additional force to open the valve against internal pressure within a tank.

BACKGROUND

Float operated vent valves are commonly used in fuel tanks to close a valve port when fuel in the tank rises above a predetermined level. In an example, a float operated vent valve can be configured as a poppet-style valve that includes a seal supported on a poppet member. In turn, a float member can be attached to or operatively connected to the poppet member. Thus, when fuel in the tank rises above a predetermined level, the float member may rise with the fuel. As a result, the seal may engage a valve seat of the valve port to close the valve port and prevent the release of fuel from the tank through the valve port.

When fuel in the tank drops below the predetermined level, the float member may full from the raised position and disengage the seal from the valve seat to open the vent valve and relieve internal pressure through the valve port. However, relatively high pressure within the tank can generate internal forces that act on the poppet member, which may cause the seal to remain engaged against the valve seat even after the fuel has dropped below the predetermined level. As a result, a relatively large release force may be needed to overcome the internal pressure within the tank to release the seal from the valve seat. For example, to achieve such a release force, the weight of the poppet member and/or float member may be increased. In another example, the float member may be provided on a distal end of a lever arm that extends from the poppet member. These designs, however, tend to increase the size and/or weight of the vent valve.

Thus, although known vent valves may function in an acceptable manner, it would be desirable to provide a float operated vent valve having a poppet member configured to require little or no additional force to open the valve against internal pressure within the tank.

SUMMARY

A vent valve is provided and may include, among other things, a valve body having an inlet opening and an outlet opening forming a flow path. The inlet opening, may be oriented in a first direction and the outlet opening may be oriented in a second direction. A poppet member may be provided on or about the valve body and can be configured for movement between an opened position and a closed position relative to the inlet opening. The poppet member may be movable along the valve body in a direction that is perpendicular to the first direction of the inlet opening. A float member may be attached or operatively connected to the poppet member. The float member can be configured to move the poppet member between the opened and closed positions.

Various aspects of the present disclosure will become apparent to those skilled in the art from the following detailed description, when read in light of the accompanying drawings.

BRIEF DESCRIPTION OF THE DRAWINGS

Embodiments of the present disclosure will now be described, by way of example, with reference to the accompanying drawings.

DETAILED DESCRIPTION

Reference will now be made to embodiments of the present disclosure, examples of which are described herein and illustrated in the accompanying drawings. While the invention will be described in conjunction with these embodiments, it will be understood that they are not intended to limit the invention to such embodiments. On the contrary, the invention is intended to cover alternatives, modifications, and equivalents, which may be included within the spirit and scope of the invention as defined by the appended claims.

Figure 1:
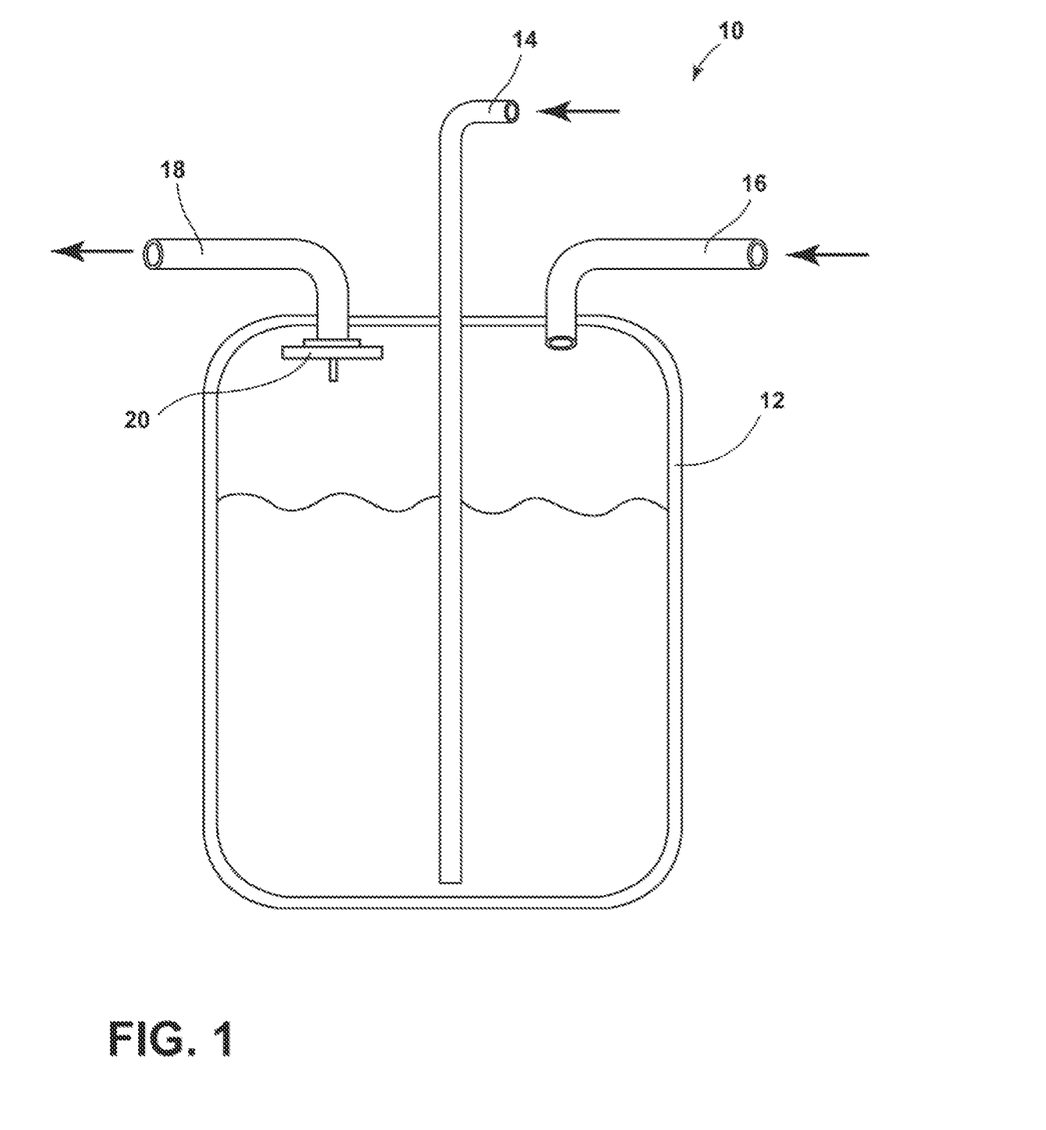
FIG. 1 is a diagram illustrating a fuel system that includes a vent valve according to an embodiment of the present disclosure.

Referring now to FIG. 1, a diagram of a fuel system, indicated generally at 10, is provided. The fuel system 10 can be used for storing and/or supplying fuel in to wide-variety of applications. The fuel system 10 may optionally include, among other components, a fuel tank 12, a fuel inlet line 14, an inert gas supply line 16, a vent line 18, and a vent valve 20.

The fuel tank 12 may be configured to hold a volume of liquid fuel, which can be supplied to the tank 12 via the fuel inlet line 14. The inert gas supply line 16 can provide a supply of inert gas within the tank 12. The vent line 18 is configured to release fuel vapors and inert gas that would otherwise accumulate in the tank 12 and increase an internal pressure therein.

The vent valve 20 can be located at an inlet of the vent line 18 to prevent the release of liquid fuel through the vent line 18, such as when the fuel level in the tank 12 rises above a predetermined level. As will be generally disclosed below, the vent valve 20 of the present disclosure is configured to require little or no additional force to open the valve 20 against a relatively high or increasing internal pressure within the fuel tank 12. Thus, the vent, valve 20 may be designed to have a reduced size and/or weight than might otherwise be required in particular applications. Although the vent valve 20 will be described and illustrated for use in the illustrated fuel system 10, the vent valve 20 can be used in any suitable environment and for any suitable purpose.

Figure 2:
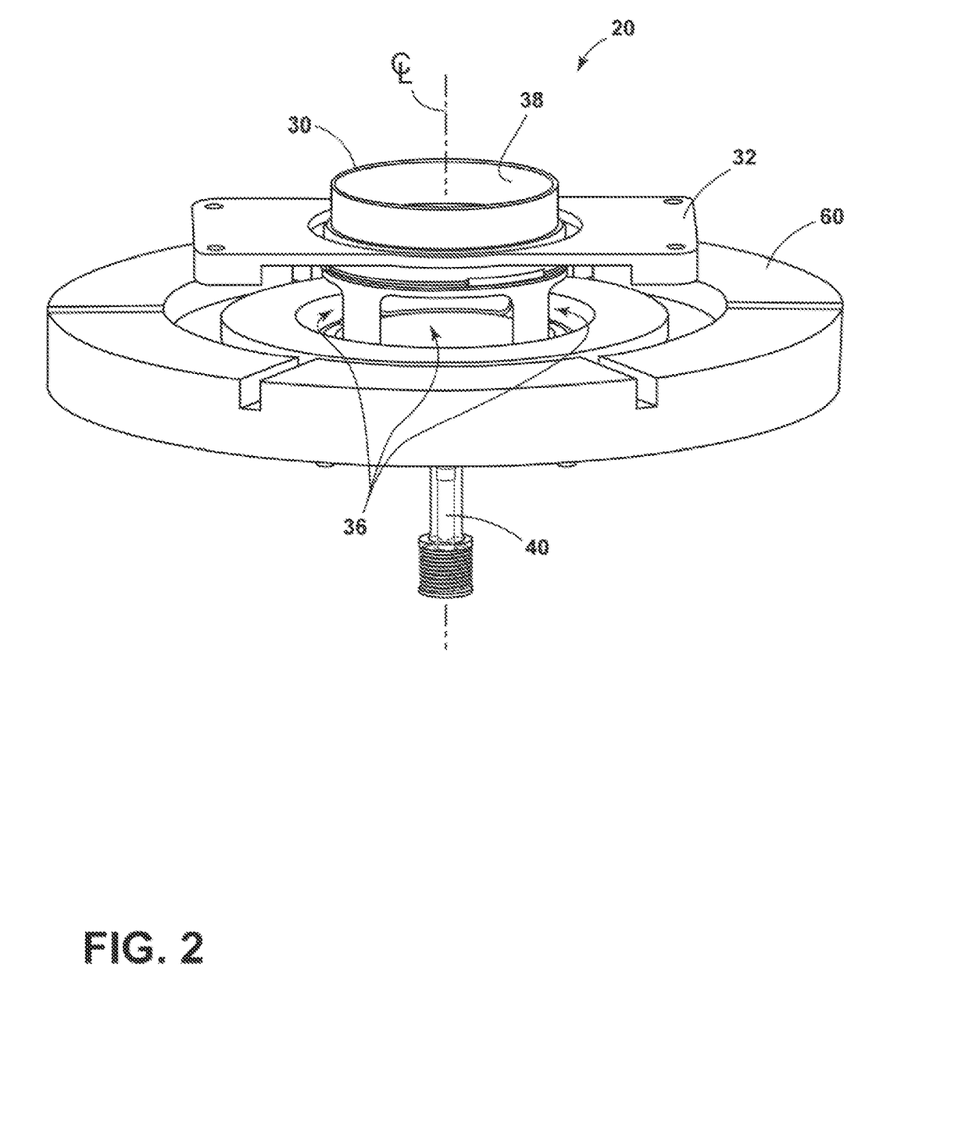
FIG. 2 is a perspective view of the vent valve shown in FIG. 1 with the vent valve generally illustrated in an opened position.

Referring now to FIG. 2, a perspective view of the vent valve 20 is provided according to an embodiment of the present disclosure. Generally speaking, the illustrated vent valve 20 may include a valve body 30, a valve stem 40 that can extend from the valve body 30, a poppet member 50 (shown in FIGS. 3 and 4) movably supported on the valve stem 40, and a float member 60 attached or operatively connected to the poppet member 50. Each of these components will be described in more detail.

The valve body 30 may include a support flange 32 for securing the vent valve 20 on or within the fuel tank 12. In an embodiment, such as generally shown in FIG. 2, the support flange 32 can be a generally flat, plate-like member and may have a plurality of through holes for receiving fasteners or other securing members. The support flange 32 may, however, have any suitable shape. Contour, or dimensions without departing from the scope of the present disclosure.

The valve body 30 may provide a flow path for fluid communication between an interior of the fuel tank 12 and the vent line 18 (shown in FIG. 1). In an embodiment, such as generally shown in FIG. 2, the valve body 30 may include one or more inlet openings 36 and at least one outlet opening 38. The inlet openings 36 can be formed in a side wall of the valve body 30. For example, the valve both 30 may comprise a generally cylindrical portion formed by a side wall, and the inlet openings 36 may be spaced around a circumference of the valve body 30, although such is not required. The outlet opening 38 may be defined by an upper, open end of the valve body 30, which can define a centerline CL of the vent valve 20. As such, the inlet openings 36 may face or otherwise be oriented in a first direction, and the outlet opening 38 may face or otherwise be oriented in a second direction. In an embodiment, for example, the inlet openings 36 may be oriented to open in a first direction that is generally perpendicular to both, the centerline CL and the outlet opening 38, and the outlet opening 38 may be oriented to open in a second direction that is generally parallel with the centerline CL, although other suitable relative orientations may be provided. Further, any suitable number of inlet openings 36 may be provided around the circumference or perimeter of the valve body 30 as desired, such as four inlet openings 36 for example.

It should be appreciated that the vent valve 20 may also include a flow deflector disposed within the valve body 30, although such is not required. The flow deflector can be configured to direct fuel vapors and other gases, which enter the inlet openings 36, out of the valve body 30 through the outlet opening 38. Conversely or in addition, the flow deflector may also direct atmospheric air entering the outlet opening 38 into the fuel tank 12 through the inlet openings 36.

In an embodiment, for example, a flow deflector can define a conically shaped structure that extends from a bottom surface of the valve body 30 near the inlet openings 36 upwardly towards the outlet opening 38, respectively. Thus, the fuel vapors may enter the inlet openings 36 in the first direction, which can be generally perpendicular to the centerline CL. The fuel vapors may be deflected by the flow deflector in the second direction, which may be generally parallel with the centerline CL (i.e., the first direction can be generally perpendicular to the second direction). The fuel vapors may then exit the valve body 30 through the outlet opening 38. The flow path as described above is generally identified by the solid arrows in FIG. 4. In other embodiments, the flow deflector may have other suitable shapes or configurations to accomplish these and other suitable functions.

Figure 3:
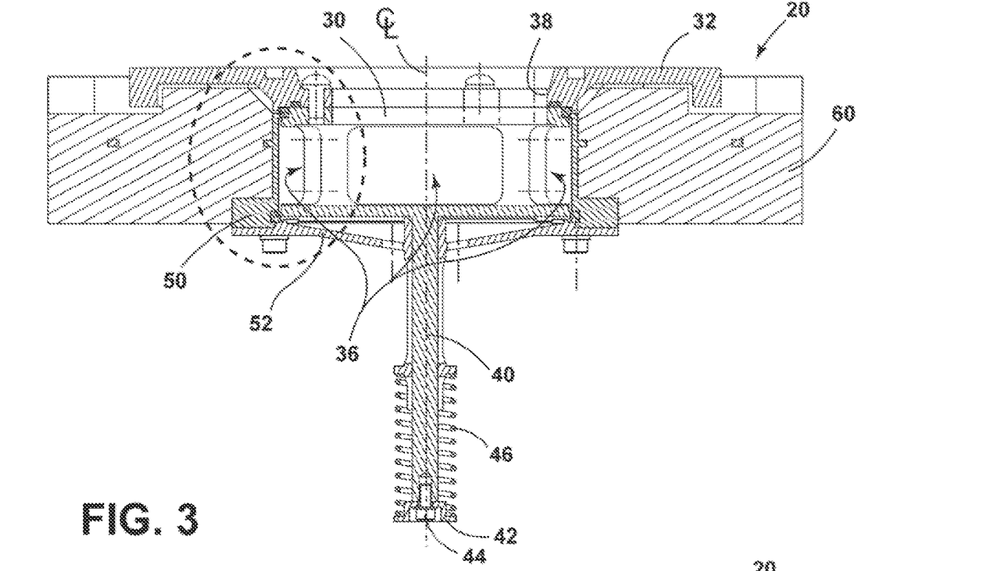
FIG. 3 is a cross-sectional side view of the vent valve shown in FIG. 2 with the vent valve generally illustrated, in a closed position.
Figure 4:
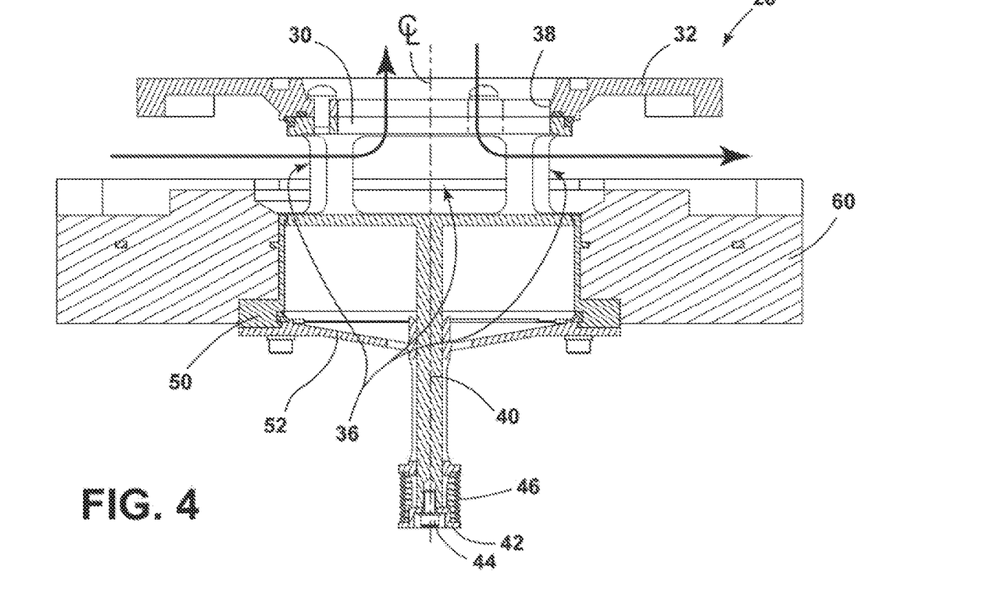
FIG. 4 is a cross-sectional side view of the vent valve shown in FIG. 2 with the vent valve generally illustrated in the opened position.

Referring now to FIGS. 3 and 4, cross-sectional side views of the vent valve 20 are provided. As briefly mentioned above, the vent valve 20 may also include a valve stem 40 that extends downwardly from the valve body 30. In an embodiment, such as generally illustrated, a valve stem 40 may generally extend along the centerline CL of the vent valve 20, although such is not required. An end flange 42 can be secured to a distal end of the valve stem 40 by a fastener 44, such as a threaded screw for example. In other embodiments, however, the end flange 42 can be secured to the distal end of the valve stem 40 using various other suitable fastening means or methods. The end flange 42 can include a lip portion configured, for example, to secure a spring member 46 around the valve stem 40, as generally disclosed below.

The vent valve 20 may also include a poppet member 50 that can, for instance, be supported for axial movement on the valve stem 40. As generally illustrated, the poppet member 50 may generally include a stem portion 52 and a sealing, portion 54. The stem portion 52 may be configured to support the poppet member 50 for sliding movement on the valve stem 40. For example, the stem portion 52 may comprise a generally elongated, hollow sleeve that can be coaxially supported on the valve stem 40. However, the stem portion 52 is not limited to that depicted, and may comprise other shapes and/or configurations, including those with a different number and/or configuration of drain holes and slots.

In an embodiment, the sealing portion 54 may comprise a generally cylindrical shaped portion that is configured to extend around a circumference or outer perimeter of the valve body 30. As such, the sealing portion 54 can be configured to close the inlet openings 36 when the vent valve 20 is in a closed position. Aspects and features associated with a sealing portion 54 are further disclosed below.

In an embodiment, the stem portion 52 and the sealing portion 54 can be separate pieces that are secured together in a suitable manner. For example, the sealing portion 54 can be secured to a first or upper end of the stem portion 52 using fasteners, a press-fit connection, an adhesive, a welded connection, or the like. The two-piece configuration may enable the stem portion 52 and/or the sealing portion 54 of the poppet member 50 to be formed using suitable molding processes. In other embodiments, however, the stem portion 52 and the sealing portion 54 can be integrally formed as a single piece if desired. It should also be appreciated that the poppet member 50 can have other suitable shapes or configurations without departing from the scope of the present disclosure.

A float member 60 may be attached or operatively connected to the poppet member 50 for automatically operating the vent valve 20 between closed, and opened positions. In a non-limiting example, the float member 60 may be attached or operatively connected directly to the poppet member 50. However, in other embodiments, the float member 60 may, for example and without limitation, be remotely attached to the poppet member 50 via a mechanical extension arm. The float member 60 can be provided in various suitable shapes and/or sizes, and may further be made from various material that is generally buoyant in a liquid, such as polyurethane for example.

A spring member 46 may be provided or otherwise disposed between the lip portion of an end flange 42 and a lower end of a stem portion 52 of the poppet member 50. In an embodiment, the spring member 46 can be configured to assist operation of the vent valve 20 from an opened position to a closed position by providing a force that acts against the weight of the poppet member 50 and float member 60. For example and without limitation, the spring member 46 may be a coil spring or other suitable spring member. In addition, the spring member 46 can be configured to create an electrical bonding path between the poppet member 50 and the valve body 30 to dissipate static electricity that may build up from air flowing through the valve to the fuel tank 12.

Figure 5:
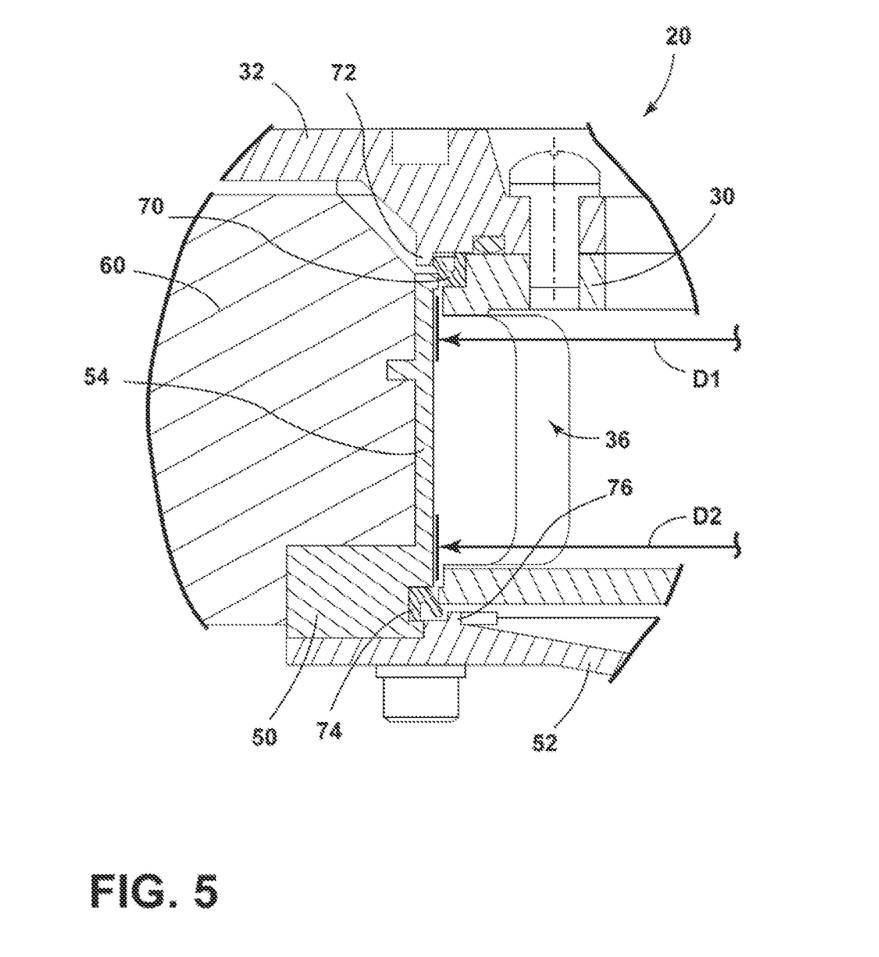
FIG. 5 is an enlarged cross-sectional side view of a portion of the vent valve shown, which is identified by the dashed circle in FIG. 3.

Referring now to FIG. 5, the vent valve 20 may further include a plurality of seals that can be configured to seal the inlet openings 36 of the valve body 30. In a non-limiting example, the vent valve 20 may generally include a first seal 70 and a second seal 74. In other embodiments, however, the vent valve 20 may include various numbers or configurations of seals without departing from the scope of the present disclosure.

A first seal 70 may be provided on the valve body 30. In an embodiment, the first seal 70 may be configured to provide a sealing connection between the outer surface of the valve body 30 and an upper edge of the sealing portion 54 when the poppet member 50 is in the closed position. For example, the first seal 70 may extend around an outer surface of the valve body 30 and can be located axially adjacent to an upper edge of the inlet openings 36, respectively. The first seal 70 may include a lip that can extend in a radial direction outwardly from the outer surface of the valve body 30 towards the poppet member 50 (i.e., away from the centerline CL). The first seal 70 may, alternatively, have various other suitable shapes or configurations to provide a sealing connection between the valve body 30 and the poppet member 50.

The first seal 70 can be secured to the valve body 30 in a suitable manner. For example, a two-piece assembly of the valve body 30, as generally disclosed above, may enable the first seal 70 to be secured directly on the valve body 30 using suitable molding processes. In an embodiment, the first seal 70 may be molded in place on the valve body 30. The support flange 32 can then be secured to the valve body 30, for example, as generally disclosed above. Such a configuration may reduce manufacturing costs of the vent valve 20, reduce potential damage to the first seal 70, and/or improve performance and durability of the vent valve 20. In other embodiments, however, the first seal 70 may alternatively be provided on the poppet member 50.

A first seal deflector 72 may be optionally provided adjacent the first seal 70 to protect the radially extending lip. For example and without limitation, the first seal deflector 72 may include an axially extending rim that extends around a circumference of the valve body 30. As generally shown, the first seal deflector 72 can be located radially adjacent to the lip of the first seal 70.

A second seal 74 may be provided on the sealing portion 54 of the poppet member 50. In an embodiment, the second seal 74 can be configured to provide a sealing connection between the poppet member 50 and a lower edge of the valve body 30 when the poppet member 50 is in a closed position. For example, the second seal 74 may extend around an inner surface of the sealing portion 54 and can be located near a bottom thereof, respectively. The second seal 74 may include a lip that can extend in a radial direction inwardly from the inner surface of the poppet member 50 towards the valve body 30 (i.e., towards the centerline CL). The second seal 74 may, alternatively, have other suitable shapes or configurations to provide a sealing connection between the valve body 30 and the poppet member 50.

The second seal 74 can be secured to the poppet member 50 in a suitable manner. For example, a two-piece assembly of the poppet member 50, as generally disclosed above, may enable the second seal 74 to be secured directly on the sealing portion 54 using suitable molding processes. In an embodiment, the second seal 74 may be molded in place on the poppet member 50. The sealing portion 54 can then be secured to the stem portion 52, for example, as generally disclosed above. Such a configuration may reduce manufacturing costs of the vent valve 20, reduce potential damage to the second seal 74, and/or improve performance and durability of the vent valve 20. In other embodiments, however, the second seal 74 may alternatively be provided on the valve body 30.

A second seal deflector 76 may be optionally provided adjacent the second seal 74 to protect the radially extending lip, although such is not required. For example and without limitation, the second seal deflector 76 may include an axially extending rim that extends around a circumference of the poppet member 50. As generally shown, the second seal deflector 76 can be located, radially adjacent to the lip of the second seal 74.

As generally shown in FIG. 5, a first contact diameter D1 of the first seal 70, which extends around the valve body 30 and the poppet member 50, may be the same as (or operatively equivalent to) a second contact diameter D2 of the second seal 74, which also extends around the valve body 30 and the poppet member 50. In this configuration, the internal pressure in the fuel tank 12 would create little or no additional force on the poppet member 50 when the poppet member 50 is moved between the opened and closed positions. In particular, movement of the poppet member 50 between the opened and closed positions does not work against the forces created by the internal pressure within the fuel tank 12. Rather, the poppet member 50 moves perpendicular to the threes created by the internal pressure within the fuel tank 12. Thus, the weight of the poppet member 50 and/or the float 60 may be generally sufficient to open the vent valve 20 regardless of internal pressure that may be present within the fuel tank 12. It should be fully appreciated that the vent valve 20 may have other suitable design configurations to accomplish this and other objectives.

Aspects of the operation of a vent valve 20 will now be generally described with reference to FIGS. 3 and 4. If the fuel level in a fuel tank 12 remains below a predetermined level, a poppet member 50 may rest in a first or opened position, such as generally illustrated in FIG. 4. In this position, fuel vapors and other gases can be released through a vent line 18 to relieve internal pressure from within the fuel tank 12.

As the fuel level in the tank 12 rises above the predetermined level, the float member 60 may also rise with the fuel and can move the poppet member 50 to a second or closed position, for example, as generally illustrated in FIG. 3. When the poppet member 50 moves to the closed position, the sealing portion 54 may slide upwardly along the valve body 30 and over the inlet openings 36, thereby covering and sealing the inlet openings 36. As such, the vent valve 20 can prevent liquid fuel from being released through the vent line 18.

As the fuel level in the tank 12 drops below the predetermined level, the float member 60 may fall and move the poppet member 50 back to its original or opened position. When the poppet member 50 moves to an opened position, the sealing portion 54 may slide downwardly along the valve body 30 to uncover the inlet openings 36. In other words, the sealing portion 54 of the poppet member 50 may be configured to move in a direction that is generally perpendicular to the threes created by the internal pressure and acting on the sealing portion 54. In the opened position, fuel vapors and other gases can be released through the valve body 30 to relieve internal pressure in the fuel tank 12.

Thus, it should be fully appreciated that the vent valve 20 can be configured to cancel or balance internal forces acting on the poppet member 50 such that little or no additional three, in addition to the weight of the poppet member 50 and/or the float member 60, may be needed to open the vent valve 20 against increasing internal pressure in the fuel tank 12. As a result, the vent valve 20 may be designed to have a relatively reduced size and/or weight.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims and their equivalents.

What is claimed is:

1. A vent valve comprising:
   a valve body having an inlet opening and an outlet opening forming a flow path, wherein the inlet opening is oriented in a first direction and the outlet opening is oriented in a second direction;
   a poppet member provided around an outer perimeter of the valve body and configured for movement between an opened position and a closed position relative to the inlet opening, wherein the poppet member is movable along the valve body in a direction that is perpendicular to the first direction of the inlet opening; and
   a float member attached or operatively connected to the poppet member, the float member configured to move the poppet member between the opened and closed positions.

2. The vent valve of claim 1, wherein the valve body includes a generally cylindrical portion having a side wall, and the inlet opening extends through the side wall and the outlet opening is defined by an open end of the valve body.

3. The vent valve of claim 2, including a plurality of inlet openings that are circumferentially spaced around the side wall of the valve body.

4. The vent valve of claim 1, further including a first seal disposed between the valve body and the poppet member for providing a sealing connection therebetween when the poppet member is in the closed position.

5. The vent valve of claim 4, wherein the first seal is provided on the valve body.

6. The vent valve of claim 5, wherein the first seal includes a circumferential lip that radially extends away from an outer surface of the valve body towards the poppet member, and the valve body includes a seal deflector provided adjacent the circumferential lip.

7. The vent valve of claim 4, further including a second seal disposed between the valve body and the poppet member for providing a sealing connection therebetween when the poppet member is in the closed position.

8. The vent valve of claim 7, wherein the first seal defines a first contact diameter that extends around the valve body, and the second seal defines a second contact diameter that extends around the valve body and that is equal to the first contact diameter.

9. The vent valve of claim 7, wherein the second seal is provided on the poppet member.

10. The vent valve of claim 7, wherein the second seal includes a circumferential lip that radially extends away from an outer surface of the poppet member towards the valve body, and the poppet member includes a seal deflector located adjacent the circumferential lip.

11. The vent valve of claim 7, wherein the poppet member includes a stem portion and a sealing portion, and the second seal is provided on the sealing portion.

12. The vent valve of claim 1, wherein the first direction of the inlet opening is perpendicular to a centerline of the valve body, and the second direction of the outlet opening is parallel with the centerline of the valve body.

13. The vent valve of claim 1, wherein the valve body further includes a support flange, and the valve body is secured to the support flange.

14. The vent valve of claim 1 further including a valve stem, and the poppet member is supported for axial movement on the valve stem.

15. The vent valve of claim 14, wherein a spring member is provided between the valve stem and the poppet member to generate a force that acts against the weight of the poppet member and the float member.

16. A vent valve comprising:
   a valve body including a generally cylindrical portion that is formed by a side wall, and an inlet opening extends through the side wall and an outlet opening is defined by an open end of the side wall so as to form a flow path through the valve body;
   a poppet member provided around an outer perimeter of the valve body for sliding movement along the side wall of the valve body between an opened position and a closed position relative to the inlet opening;
   a first seal and a second seal disposed radially between the valve body and the poppet member for sealing the inlet opening, wherein the first seal defines a first contact diameter that extends around the valve body, and the second seal defines a second contact diameter that extends around the valve body that is equal to the first contact diameter; and
   a float member attached or operatively connected to the poppet member, the float member configured to move the poppet member between the opened and closed positions.

17. The vent valve of claim 16, wherein the first seal is provided on the valve body and the second seal is provided on the poppet member.

18. The vent valve of claim 16, wherein the inlet opening is oriented in a first direction that is perpendicular to a centerline of the valve body, and the outlet opening is oriented in a second direction that is parallel with the centerline of the valve body.

19. A fuel system comprising:
   a fuel tank including a vent line for venting internal pressure from the fuel tank; and
   a vent valve disposed within the fuel tank for fluid communication with the vent line, the vent valve comprising:
   a valve body having an inlet opening and an outlet opening forming a flow path, wherein the inlet opening is oriented in a first direction and the outlet opening is oriented in a second direction;

a poppet member provided around an outer perimeter of the valve body and configured for movement between an opened position and a closed position relative to the inlet opening, wherein the poppet member is movable along the valve body in a direction that is perpendicular to the first direction of the inlet opening; and a float member attached or operatively connected to the poppet member, the float member configured to move the poppet member between the opened and closed positions.

20. The fuel system of claim 19 further including a first seal and a second seal disposed between the valve body and the poppet member for sealing the inlet opening, wherein the first seal defines a first contact diameter that extends around the valve body, and the second seal defines a second contact diameter that extends around the valve body and that is equal to the first contact diameter.

\* \* \* \* \*